United States Patent [19]
Nagler

[11] Patent Number: 4,525,035
[45] Date of Patent: Jun. 25, 1985

[54] WIDE ANGLE EYEPIECE

[76] Inventor: Albert Nagler, 15 Green Hill La., Spring Valley, N.Y. 10977

[21] Appl. No.: 568,407

[22] Filed: Jan. 5, 1984

[51] Int. Cl.³ .................. G02B 9/58; G02B 25/04
[52] U.S. Cl. ........................... 350/410; 350/469
[58] Field of Search ....................... 350/410, 469

[56] References Cited
U.S. PATENT DOCUMENTS 3,390,935  7/1968  Scidmore ............... 350/410
4,286,844  9/1981  Nagler ................. 350/410

Primary Examiner—John K. Corbin
Assistant Examiner—Rebecca D. Gass
Attorney, Agent, or Firm—William P. Keegan

[57] ABSTRACT

A wide angle eyepiece having reduced astigmatism at the edge of the field and comprising a doublet, a singlet, a singlet, and a doublet, wherein the doublets have negative power.

1 Claim, 1 Drawing Figure

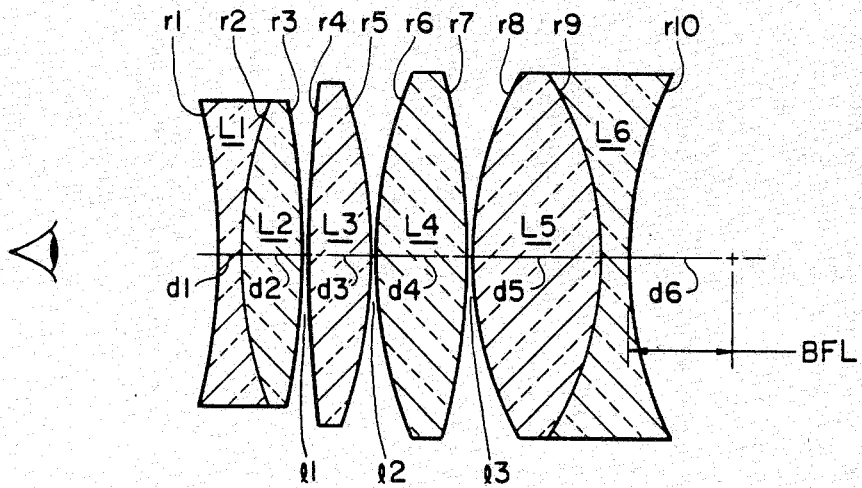

WIDE ANGLE EYEPIECE

FIELD OF THE INVENTION

The invention relates to an eyepiece for astronomical instruments, and more particularly to a wide angle eyepiece having reduced astigmatism at the edge of the field.

BACKGROUND OF THE INVENTION

Astronomical eyepieces with reduced astigmatism have been provided for wide field viewing, as in Nagler U.S. Pat. No. 4,286,844, but in that disclosure they have embodied large complex lenses. A simpler wide angle eyepiece is disclosed in Scidmore U.S. Pat. No. 3,390,935. This latter disclosure shows an eyepiece employing, from the front to the eye lense, a doublet, two singlets, and a doublet. The present invention embodies a similar general configuration of lenses, but with significant differences in the performances of the two eyepieces.

GENERAL DESCRIPTION OF THE INVENTION

It is the object of the invention to provide an improved wide angle eyepiece having reduced astigmatism at the edge of the field.

It is another object of the invention to provide an improved wide angle eyepiece having sharp edge of the field imaging while retaining excellent correction for spherical aberration, axial and lateral color, and coma.

In carrying out the invention, there is provided an eyepiece comprising, from the front to the eye lens, a doublet, a singlet, a singlet, and a doublet, with both doublets, significantly, having negative power and being thus distinguishable over the prior art.

BRIEF DESCRIPTION OF THE DRAWING

The single FIGURE of the drawing schematically shows an eyepiece according to the present invention.

DETAILED DESCRIPTION OF THE INVENTION

The eyepiece shown in the drawing is a preferred embodiment of a 40 mm. focal length wide field eyepiece. With fast objectives, i.e., f/4 to f/5 objectives, the eyepiece may be used most effectively in a 65° to 70° range, although it may also be useful up to 80°. At a 65° field, the eyepiece has an astigmatism of 0.053 F, where F is the focal length of the eyepiece, and a Petzval radius of 2.019 F.

More specifically, the external biconcave lens elements L1 and L6 are SF-1 glass having a refractive index $N_d$ equal to 1.717 and an Abbe Number $\nu$ of 29.5. The remaining lens elements L2 and L5, and lenses L3 and L4, are SK-16 glass having a refractive index $N_d$ equal to 1.620 and an Abbe Number $\nu$ of 60.3. The first or eye doublet, consisting of lens element L1 cemented to lens element L2 has a total power of $-7.46$ F where F is the focal length of the eyepiece. Biconvex lens L3 with a power of 2.51 F and biconvex lens L4 with a power of 1.89 F have their stronger curvatures facing each other. The field doublet consisting of biconvex lens element L5 cemented to biconcave element L6 has a power of $-70.7$ F. It is believed significant in the configuration of the present eyepiece that both doublets have negative power.

The eye doublet, i.e., L1 and L2, is separated from singlet L3 by an air space of 0.30 mm. The separations of singlet L3 from singlet L4, and that of singlet L4 from doublet L5, L6, are also 0.30 mm. air spaces. Further lens data for the particular embodiment disclosed are shown in the accompanying table where lens radii, diameters, and axial thicknesses are given in millimeters.

| Lens | Radii | Axial Thickness | Lens Diameter |
|---|---|---|---|
| | r1 = −98.30 | d1 = 3.55 | 50 |
| | r2 = +68.76 | d2 = 10.22 | 50 |
| | r3 = −123.86 | | |
| L3 | r4 = +234.80 | d3 = 10.22 | 56 |
| | r5 = −82.86 | | |
| L4 | r6 = +76.48 | d4 = 15.32 | 60 |
| | r7 = −111.24 | | |
| | r8 = +60.13 | d5 = 21.21 | 60 |
| L5, L6 | r9 = −54.27 | d6 = 4.42 | |
| | r10 = +66.20 | | |

An eyepiece constructed according to the foregoing specification retains excellent correction for spherical aberration, axial and lateral color, and coma, while achieving the reduced astigmatism previously noted, thus making it particularly useful with telescopic instruments. The back focal length BFL of the eyepiece is 17.5 mm.

Having thus described the invention, it is to be understood that the specification and the drawing are to be interpreted as illustrative and not in a limiting sense.

What is claimed is:

1. An eyepiece comprising a doublet, a singlet, a singlet, and a doublet, wherein each doublet includes a biconcave element cemented to a biconvex element and has a negative power, and each singlet is a biconvex lens with its stronger curvature facing the other singlet, and wherein the biconcave lens elements have a refractive index of 1.717 and an Abbe Number of 29.5 and the biconvex lens elements have a refractive index of 1.620 and an Abbe Number of 60.3, and wherein, for a 40 mm. focal length eyepiece, the lens data conforms substantially to the following table wherein lens radii, diameters, and axial thicknesses are given in millimeters:

| Lens | Radii | Axial Thickness | Lens Diameter |
|---|---|---|---|
| | r1 = −98.30 | d1 = 3.55 | 50 |
| | r2 = +68.76 | d2 = 10.22 | 50 |
| | r3 = −123.86 | | |
| L3 | r4 = +234.80 | d3 = 10.22 | 56 |
| | r5 = −82.86 | | |
| L4 | r6 = +76.48 | d4 = 15.32 | 60 |
| | r7 = −111.24 | | |
| | r8 = +60.13 | d5 = 21.21 | 60 |
| L5, L6 | r9 = −54.27 | d6 = 4.42 | |
| | r10 = +66.20 | | | and the separations between the doublets and the adjacent singlets, and between the singlets are 0.30 mm. air spaces.

* * * * *